Patented Aug. 12, 1924.

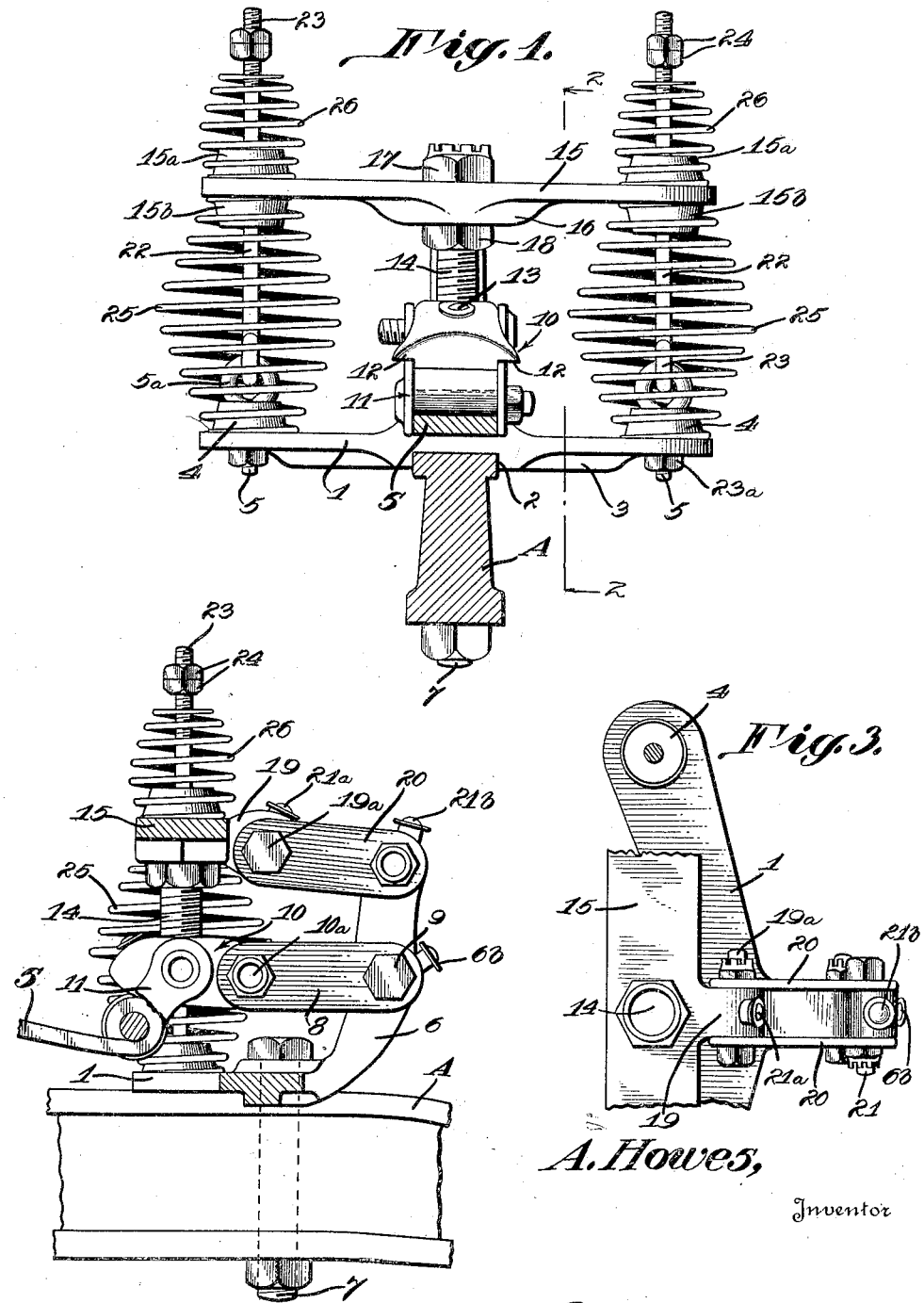

1,504,477

UNITED STATES PATENT OFFICE.

ALBERT HOWES, OF SANTA CRUZ, CALIFORNIA.

SHOCK ABSORBER.

Application filed September 7, 1922. Serial No. 586,710.

*To all whom it may concern:*

Be it known that I, ALBERT HOWES, a citizen of the United States, residing at Santa Cruz, in the county of Santa Cruz and State of California, have invented a new and useful Shock Absorber, of which the following is a specification.

This invention relates to shock absorbers and more particularly to shock absorbers for Ford or Chevrolet cars.

The object of the invention is to provide an absorber of this character in which the load is borne directly by the spring coils of the absorber and does not bind the main spring in any way but operates in conjunction therewith completely checking the rebound of the car and which keeps the car on an even keel under all conditions of the road.

Another object is to provide an absorber having specially constructed coiled springs, the coils being so formed that they telescope without contact, insuring a maximum resiliency and in which light loads are borne by the three center coils which are very flexible and taper to the smaller heavy coils.

Another object is to provide main coiled springs connected with recoils which are adjustable to regulate and control the action of the main coiled springs and which are so mounted as to take up any movement other than the up and down movement.

Another object is to provide an absorber which is light and sturdy and extremely sensitive in its action with no moving parts to get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of the absorber constituting this invention shown applied to the front spring of a Ford car, the spring axle of the car being in section.

Fig. 2 is a transverse section taken on the line 2—2 of Fig. 1, and

Fig. 3 is a detail top plan view.

The absorber constituting this invention is shown mounted on the front axle A of a Ford car and comprises a metal casting 1 in the form of an elongated plate provided on its lower face with a transversely extending seat 2 to fit over the upper edge of the car axle, said seat operating to hold the casting against movement on the axle. This plate 1 is reinforced by longitudinally extending enlargements 3 on its lower face, the ends of said plate being apertured and provided on their upper faces with bosses 4 through which and the apertures in said ends extend eye bolts 5, the eyes 5$^a$ thereof projecting parallel and with which are connected eyes 23 of recoil bolts or rods 22 which carry the shock absorbing springs 25 and the recoil springs 26. The recoil rods 22 have their upper ends threaded and provided with lock nuts 24 while the lower ends of bolts 5 are also equipped with nuts as shown at 23$^a$. An outwardly and upwardly curved standard 6 rises from the outer edge of the plate 1, being cast integral therewith.

The casting plate 1 is apertured at the base of the standard 6 for the passage therethrough of a securing bolt 7 which takes the place of the ordinary perch iron used on Ford cars. These perch irons are removed and the shock absorbers constituting this invention substituted and connected by the bolt 7 with the axle A.

The standard 6 is provided at longitudinally spaced points with bolt receiving apertures one of which is arranged midway the length of the standard and is designed to receive a bolt 9 which pivotally connects one end of a pair of arms 8 which straddles the standard 6 and have pivotally mounted in their front ends a T-shaped casting 10, the head of which carries the vehicle spring supporting shackle 11, said spring being shown at S. The head of this casting 10 is provided at its opposite ends with laterally extending stops 12 in the form of lugs with which the shackle 11 engages and thereby prevents the shackle from swinging back or inward on the rebound exerting an upward action on the casting and operating the recoil springs 26 presently to be described. These stops 12 do not check the action of the car spring and shackle on the downward and outward movement, their object being simply to operate the recoil springs.

This casting 10 is bushed to receive the bolt 10ª which connects the shackle therewith and an oiler 13 is arranged to supply oil to the bolt 10ª on which the shackle swings in the bushing.

The upper face of the head of the casing 10 has a threaded socket to receive a shackle brace rod 14 which holds the absorber in place and prevents it from tipping back and produces a straight up and down action on the recoil springs. This rod 14 is threaded as shown in Fig. 1 and passes through a cross bar 15 being provided on opposite faces of said bar with nuts 17 and 18. This bar 15 is reinforced on its lower face by a longitudinally extending boss 16 which surrounds the aperture through which the rod 14 passes. By releasing the lower nut 18, and tightening the upper nut 17, the car may be set at the proper heighth without going to extremes either way and in case the coils of the springs 25 become sagged the car may be raised to the proper place.

The cross bar 15 is provided at its rear edge with a bearing 19 to receive a bolt 19ª which pivotally connects with the cross bar two links 20 which straddle the bearing and at their opposite ends straddle the upper end of the standard 6 and are pivotally connected therewith as shown at 21, oilers 21ª and 21ᵇ being provided for lubricating these joints as is shown clearly in Figs. 2 and 3.

The shock absorbing springs 25 are made barrel-shaped as shown clearly in Fig. 1, being mounted on the rods 22 between the plate 1 and the cross bar 15, the bosses 4 on the plate fitting in the lower ends of these springs and those 15ᵇ on the lower face of the cross bar fitting in the upper ends of said springs. This barrel formation of the springs produces coils each a little smaller than the preceding one and which telescope one another without contacting preventing them becoming solid under heavy loads. The three center coils of these springs are much more flexible than the smaller end coils, and these end coils automatically take up the heavier load.

The recoil springs 26 are constructed similarly to the springs 25 and act in a similar manner being mounted on the upper ends of the rods 22 above the cross bar 15. These rods 22 being swiveled on the plate 1 take up any movement other than the up and down and the recoil springs 26 regulate and control the action of the main coil springs by either loosening or tightening them.

From the above description it will be obvious that the absorber takes the place of the usual solid perch connection between the spring S and the axle.

The absorber which is here shown mounted on the front spring of a Ford car may also be used on the rear and equally well on the Chevrolet car. The only difference in the application of the absorber to the Chevrolet cars is that the car does not hang on the top casting but rests on it, being connected solidly to the car frame and extending to the coils which are placed in close proximity. The lower casting or plate 1 of the absorber is made to fit the car axle and clamped in position thereon. The only change to be made in the Chevrolet car when this absorber is applied is to remove two leaves of the car spring to weaken it.

I claim:—

1. In a shock absorber, a supporting casting, means for mounting said casting on a car, a standard rising from said casting, a cross bar flexibly carried by said standard and having depending means for supporting the main vehicle spring, coiled load supporting springs arranged between said casting and cross bar, swiveled rods carried by said casting and extending through said springs and cross bar, and recoil springs mounted on said rods above said cross bar.

2. In a shock absorber, a casting having means for mounting on a car, a standard rising from said casting and fixed thereto, upper and lower pairs of links pivotally connected at one end with said standard, a cross bar pivotally connected with the other ends of the upper pair of said links, and a spring supporting shackle carried by the free ends of the lower pair of links, an adjustable connection between said shackle and cross bar, coiled springs arranged between said casting and cross bar, and recoil springs for controlling the action of said coiled springs.

3. In a shock absorber, a casting having means for mounting on a car, a standard rising from said casting, and fixed thereto, upper and lower pairs of links pivotally connected at one end with said standard, a cross bar pivotally connected with the other ends of the upper pair of said links, and a spring supporting shackle carried by the free ends of the lower pair of links, an adjustable connection between said shackle and cross bar, coiled springs arranged between said casting and cross bar, recoil springs for controlling the action of said coiled springs, and means for preventing the shackle from swinging back on the rebound and exerting an upward action on the shackle whereby the recoil springs are operated.

In testimony that I claim the foregoing as my own, I have hereto affixed my signature in the presence of two witnesses.

ALBERT HOWES.

Witnesses:
 EDWIN L. LEACH,
 EMMA J. STEWART.